(12) United States Patent
Maddali et al.

(10) Patent No.: US 9,292,368 B2
(45) Date of Patent: Mar. 22, 2016

(54) METHOD AND APPARATUS FOR INVOKING NATIVE FUNCTIONS OF A MOBILE DEVICE TO CONTROL A SET-TOP BOX

(75) Inventors: Balamuralidhar Maddali, Chennai (IN); T. Sahaya George, TamilNadu (IN); Madan Kanth Lanka, Andhra Pradesh (IN); Thalha Yasir Refaye, Chennai (IN); Mahendra Nimishakavi, Hyderabad (IN); Ravikiran Tummala, Andhra Pradesh (IN); Vasanthakumar Sarpasayanam, Pondicherry (IN); Sivasankari S. Vekataramamoorthy, Chennai (IN); Shivakrishna Kanike, Andra Pradesh (IN); Gourgopal Nandi, West Bengal (IN); Vikaskumar Gupta, Jharkhand (IN); Naman Patel, Gujarat (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 873 days.

(21) Appl. No.: 12/978,855

(22) Filed: Dec. 27, 2010

(65) Prior Publication Data
US 2012/0166655 A1    Jun. 28, 2012

(51) Int. Cl.
| | |
|---|---|
| G06F 15/16 | (2006.01) |
| G06F 9/54 | (2006.01) |
| H04L 29/08 | (2006.01) |
| H04N 21/4227 | (2011.01) |
| H04N 21/61 | (2011.01) |

(52) U.S. Cl.
CPC ............... *G06F 9/547* (2013.01); *H04L 67/02* (2013.01); *H04N 21/4227* (2013.01); *H04N 21/6125* (2013.01); *H04N 21/6175* (2013.01)

(58) Field of Classification Search
CPC .... G06F 9/547; H04L 67/02; H04N 21/4227; H04N 21/6125; H04N 21/6175
USPC ............ 709/228, 219; 725/74, 100, 152, 106, 725/133
See application file for complete search history.

(56) References Cited

U.S. PATENT DOCUMENTS

| | | | | |
|---|---|---|---|---|
| 6,886,095 | B1 * | 4/2005 | Hind et al. | 713/168 |
| 8,150,387 | B2 * | 4/2012 | Klein et al. | 455/420 |
| 2009/0233593 | A1 * | 9/2009 | Ergen et al. | 455/420 |
| 2011/0320525 | A1 * | 12/2011 | Agarwal et al. | 709/203 |
| 2012/0135724 | A1 * | 5/2012 | Lewis et al. | 455/422.1 |
| 2012/0297404 | A1 * | 11/2012 | Slotznick | 725/5 |

* cited by examiner

*Primary Examiner* — Jungwon Chang

(57) ABSTRACT

An approach is provided for controlling a user device native function via a web-based application at a user device (e.g., a mobile terminal). The mobile terminal executes a web-based application and a shell application, wherein the shell application provides communication between the web-based application and a native function of the mobile terminal. The mobile terminal registers the web-based application with the shell application for the communication. The mobile terminal invokes the native function of the mobile terminal via the communication based upon a communication protocol that specifies a command of a native function associated with a set top box.

18 Claims, 9 Drawing Sheets

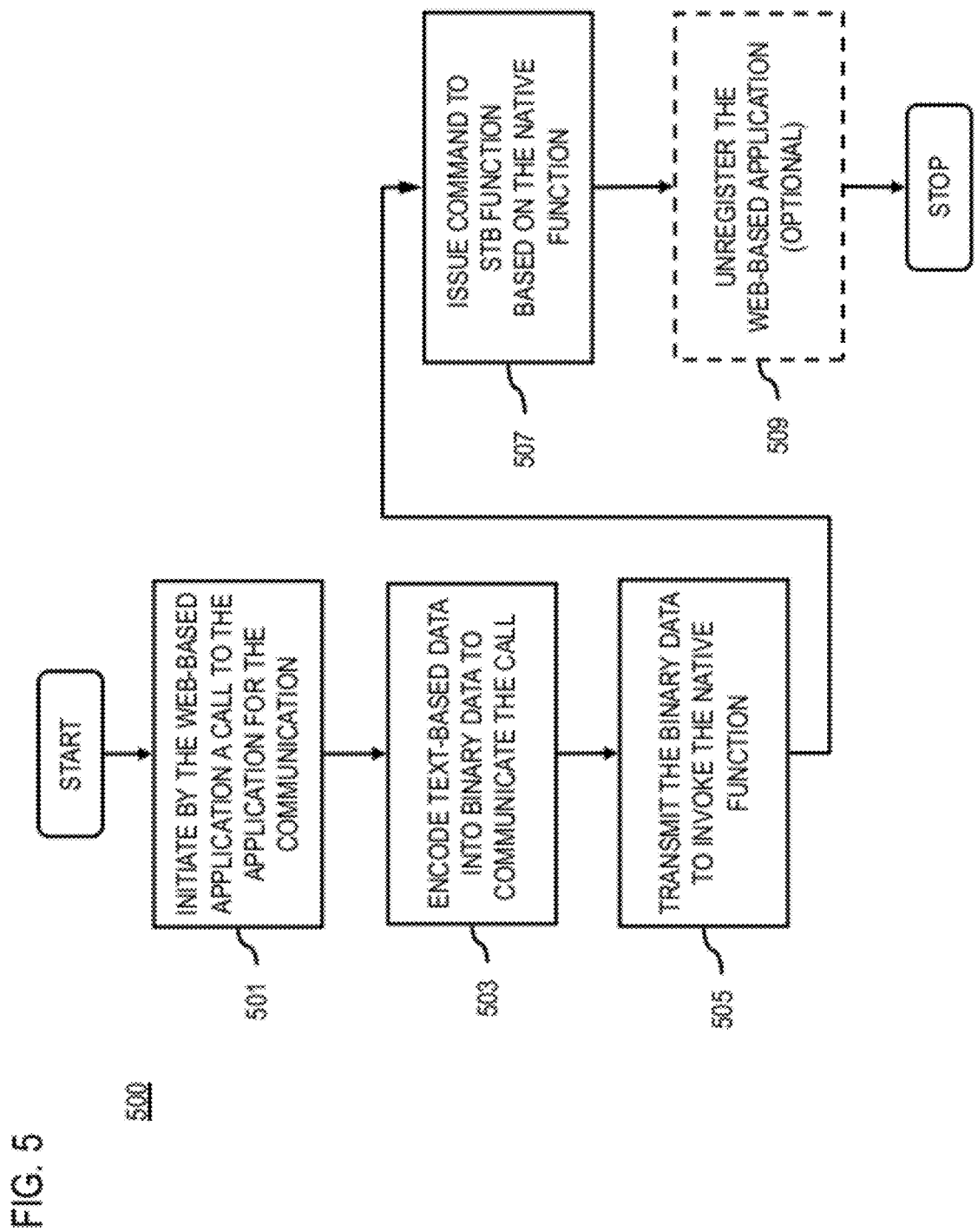

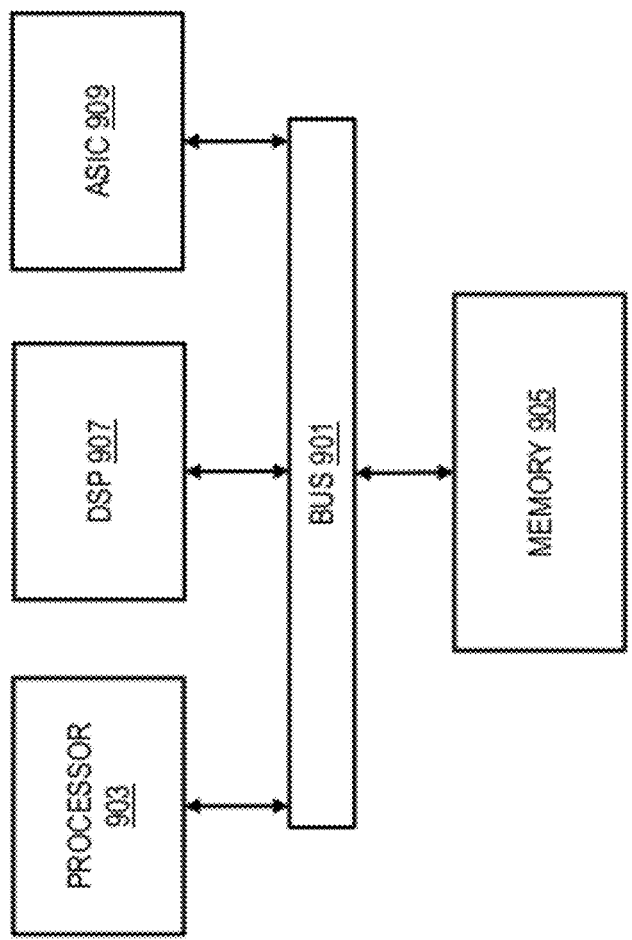

METHOD AND APPARATUS FOR INVOKING NATIVE FUNCTIONS OF A MOBILE DEVICE TO CONTROL A SET-TOP BOX

BACKGROUND INFORMATION

As consumers demand integrated services and features of radio, television, internet, wireless phone, global positioning system (GPS), etc, telecommunication service providers are challenged to provide media services that involve these various technologies seamlessly. Hence, significant research and development have been conducted to integrate the various mediums and to support the seamless sharing and experience of media. Traditionally, television service providers and manufacturers have produced remote control devices that are specific to the set top box (STB), which manages and presents content to the user. Little or no effort has been made to interface STBs using other user devices, particularly communication devices—e.g., mobile phones.

Therefore, there is a need for an approach to efficiently interact with set-top boxes through user devices that also provide communication services.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 5 is a flowchart of a process for controlling, via a wireless user device, a function of a set top box, according to an exemplary embodiment;

FIG. 9 is a diagram of a chip set that can be used to implement various exemplary embodiments.

DESCRIPTION OF THE PREFERRED EMBODIMENT

A preferred apparatus, method, and system for invoking native functions of a mobile device are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a digital media receiver, a video-enabled phone, an AV-enabled personal digital assistant (PDA), and/or a personal computer (PC), as well as other like technologies and customer premises equipment (CPE). Furthermore, although the STB is explained in the context of a mobile terminal native function, it is contemplated that other user devices communicating with the STB and other native functions of the other user devices that are associated with the STB are applicable.

Figure 1:
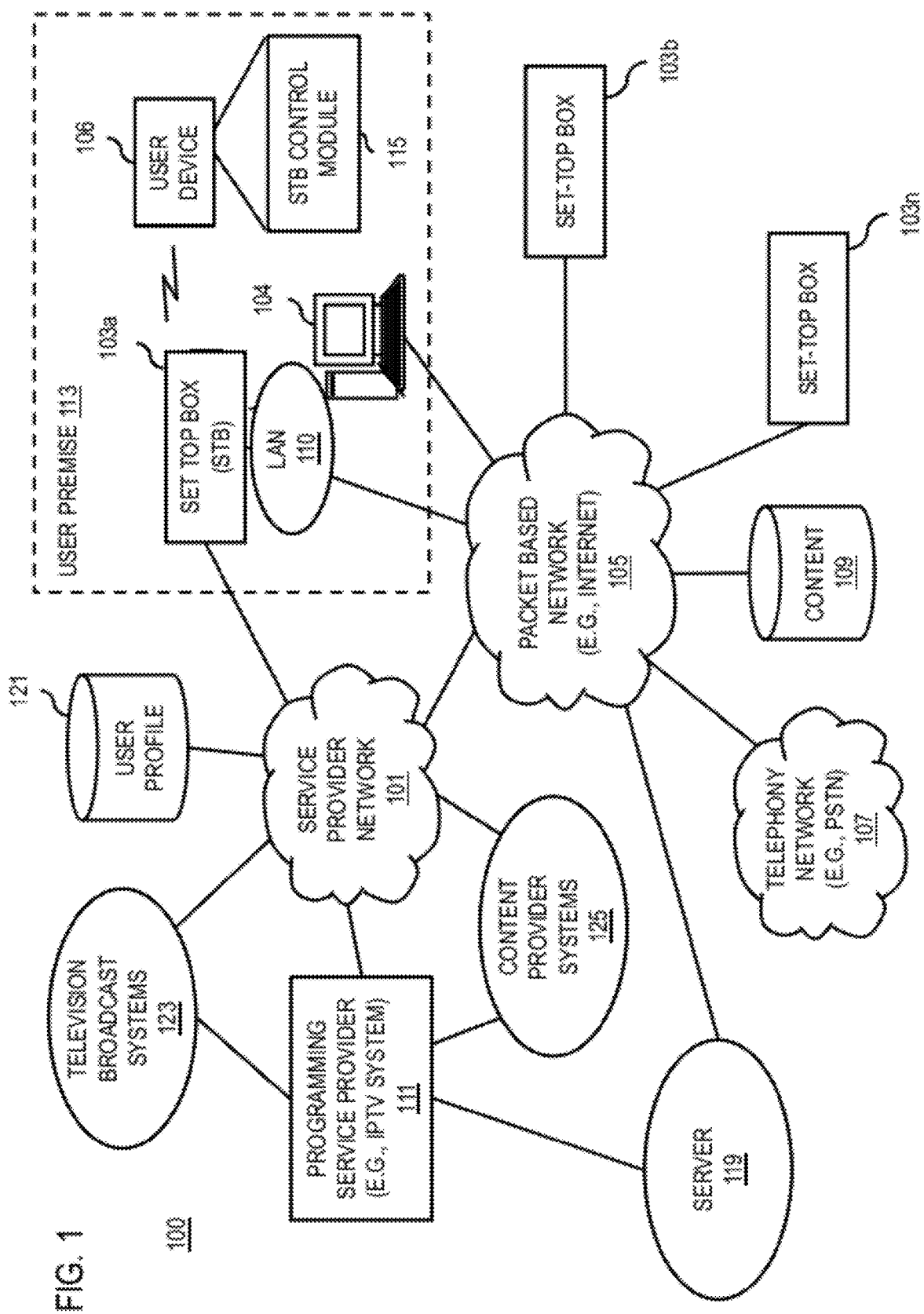
FIG. 1 is a diagram of a system capable of controlling a mobile terminal native function via a web-based application at a user device, according to an exemplary embodiment.

FIG. 1 is a diagram of a system capable of controlling a mobile terminal native function via a web-based application at a user device, according to an exemplary embodiment. For the purpose of illustration, system 100 for remotely controlling content processing devices 103a-103n (e.g., set-top boxes (STBs)) using native functions of user devices (of which only one device 106 is shown). The system 100 includes a service provider network 101 that integrates the television medium with that of the telecommunications, computing, and media environments, thereby broadening the scope of devices and sources available to individuals for obtaining programming content or other media. By way of example, the service provider network 101 provides programming content that may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form. Within user premise 113, content processing device 103a can communicate with a computing device (or terminal) 104 over a local area network (LAN) 110. Also, user device 106 can communicate directly with STB 103a using a peer-to-peer wireless connection (e.g., wireless fidelity (Wi-Fi)) or over LAN 110 to control the STB 103a. In this manner, user devices 106 allow users to control STB 103a to, for example, select a content item from a shared library and then play the selected content item.

In some embodiments, interactions with the set top boxes 103a-103n include detection and/or reception of media signals, actions or activities associated with interactive media (such as audio applications, video applications, gaming applications, etc.). The user device 106, according to various embodiments, may be any type of computer device or mobile device having the capability to support data communications via software, firmware, and/or hardware. Computer devices may include desktop computers, notebook computers, servers, terminal workstations, gaming systems, customized hardware, or other equivalent apparatus. Mobile devices may include wireless telephones, cellular telephones, satellite telephones, personal digital assistants (PDA), pocket personal computers, smart phones, tablets, handsets, portable gaming systems, and customized hardware, as well as other mobile technologies capable transmitting data.

Under the scenario of FIG. 1, STBs 103a-103n and/or a terminal 104 can communicate using a packet-based network 105 and/or a telephony network 107. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (Wi-Fi) networks, other wireless networks (e.g., 3G wireless broadband networks, mobile television networks, radio networks, etc.), terrestrial broadcasting networks, provider specific networks (e.g., a Verizon® FiOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect the STBs 103a-103n to various sources of media content. Although depicted in FIG. 1 as separate networks, the packet-based network 105 and/or the telephony network 107 may be completely or partially contained within the service provider network 101. For example, the service provider network 101 may include facilities to provide for transport of packet-based and/or telephony communications.

As traditional television programming (e.g., "over-the-air" programming, cable programming, satellite programming, etc.) merges with the online content (e.g., network-streamed content, on-demand content, Internet programming, media-sharing websites, etc.), the available programming choices continues to grow, such as internet television programs, web TV programs, user generated content, etc. However, no such media convergence is available for user devices to transfer to set top boxes all forms and formats of media items that the user has created, purchased, or otherwise accumulated, to be rendered on a display or TV set. Such deficiency stems, in part, from the lack of accessibility to the native functions of the user devices that can be used to control set top boxes.

These user devices can download a native device application to run on the user device, thereby allowing the user to access device native functions, such as global positioning system (GPS), contacts, camera, accelerometer, etc. These robust applications work as if they are part of the user device. However, the existing device native application is platform specific such that the user is required to visit different platform related websites to download different device applications for, e.g., Android®, Blackberry®, Symbian®, etc. Traditionally, no multi-platform control mechanism between the user devices and set top boxes exists, and thereby limiting users to remotely control set top boxes that are of different platforms as the user devices.

To address this problem, the system 100 of FIG. 1 enables the control of set top boxes across multiple platforms by a user device via a local application (e.g., web-based application), according to one embodiment. By way of example, a shell application is created using web technology (e.g., hypertext mark-up language (HTML), cascading style sheet (CSS), and scripting language (e.g., JavaScript)) to access, through a common application programming interface (API), all of the user device's native functions like native applications. The shell application can run on top of, for instance, a common web runtime application, which implements a standard (e.g., W3C technical recommendation) for widgets; as such, the shell application is compatible with multiple platforms. Via the shell application, any web engine can control the native functions of the user device via a web-based application, thereby retrieving set top box related information and interact with the set top boxes across different platforms. In one embodiment, user device 106, e.g., a mobile phone, can download and install such a shell application in the same manner as native applications.

As discussed, media or programming content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the programming service provider 111 may provide (in addition to the provider's own programming content) content obtained from other sources, such as one or more television broadcast systems 123, one or more third-party content provider systems 123, content residing in a repository 109 or accessible via a server 119, as well as available via one or more packet-based networks 105 or telephony networks 107, etc.

The STBs 103a-103n may be used alone or in combination with one or more end terminals 104 to implement various exemplary embodiments relating to receiving commands from a user device 106. As shown, the user device 106 possesses a STB control module 115, which is configured to interact with a web-based application and to receive control signals or messages from one or more native functions of the user device 106 with respect to content and functions of the set top box 103a-103n. The STB control module 115 can also provide voice recognition capability to convert speech or voice into text data, which is then used to interact with a native function of the user device 106 to generate an STB command or an STB associated command. According to one embodiment, the STB command includes retrieving favorite channel information at a set top box, retrieving a list of media content items available at a set top box, etc. Furthermore, the STB associated command can provide for retrieving a list of available set top boxes, sending a list of available set top boxes, establishing a connection to one or more set top boxes, sending one or more remote control commands to one or more set top boxes, pushing one or more media content items to one or more set top boxes, etc.

It is also contemplated that a particular web-based application can trigger a sequence of native functions—e.g., as in a "macro" or script. For example, if a web-based application is detected by the user device 106 as active, the STB control module 115 can generate a series of commands, for instance, to register the web-based application with the shell application and to check if the user device 106 is communicably connected with one or more STBs 103a-103n. As will be more fully described later, the set top box 103a can wirelessly (e.g., using Wi-Fi) detect presence of the terminal 104 (assuming terminal is so configured to communicate wirelessly) and the user device 106 in response to a broadcast message. Thereafter, the set top box 103a can receive instructions or commands from the user device 106, as more fully described below with respect to FIGS. 3-5.

By way of example, the STB 103a-103n can remotely access one or more servers (e.g., the server 119), via a communication interface (not illustrated), configured to execute one or more applications in support of the call for a device native function-based controls. In one embodiment, the web-based application can be executed by the user device 106 solely or in conjunction with the STB 103. Alternatively, this web-based application can be executed by the STB 103. In which case, information about the native functions of the user device 106 and the relevant set top box interactions can be transmitted to the STB 103 with little or no processing by the user device 106. The web-based application interacts with user device 106 to generate control signals (e.g., commands, etc.) associated with the STB 103. Under this arrangement, the web-based application may be provided in a distributed fashion using, for instance, client-server architectures, such as implemented by enterprise application service providers (ASP).

In one embodiment, the server 119 is an "online" system capable of communicating with one or more third-party web servers (not illustrated), content repositories (e.g., repository 109), or equivalent facilities, to provide users various avenues to locate, specify, receive, and/or share programming content that is accessible over a data network (e.g., the packet-based network 105). For example, exemplary embodiments of media slideshow application may comprise hypertext markup language (HTML) user interfaces or JAVA™ applets stored on the server 119 and accessed via world-wide-web pages. These interfaces are particularly useful in extending the system 100 functionality to devices having limited resources (e.g., PDAs, handsets, thin-clients, etc.). In alternative embodiments, the server 119 is collocated with and/or integrated into the programming service provider 111. As such, multiple users, interfaces, and instances of the media slideshow application can be simultaneously realized through the system 100.

In the example of FIG. 1, the STBs 103a-103n are located at one or more user premises (e.g., the user premise 113), and geospatially associated with one or more regions. The STBs 103a-103n may be configured to communicate with and receive signals and/or data streams from the programming service provider 111 (or other transmission facility). These signals include results of applying search or browse operations on the available programming content (e.g., video assets) and related date (e.g., programming guide data, metadata) retrieved over a data network (e.g., the service provider network 101, the packet-based network 105, and/or the telephony network 107), as well as conventional video broadcast content.

In one embodiment, a user profile repository 121 may be employed to maintain subscribers to the device native function-based STB control service. The user profile repository 121 along with the content repository 109, or the server 119 may be accessed via one or more service provider networks 101 and/or packet-based networks 105. In one embodiment, the user profile repository 121 stores user settings, preferences, and configuration information for the content delivery service.

In an exemplary embodiment, the STBs 103a-103n can draw, receive, and/or transmit programming guide information and related content from (or to) multiple sources, thereby alleviating the burden on any single source, e.g., the programming service provider 111, to gather, supply, or otherwise meet the content demands of any user or premise. Thus, particular embodiments enable authenticated third-party television broadcast systems 123, third-party content provider systems 125, and servers (e.g., the server 119) to transmit programming content accessible over a data network to the STBs 103a-103n either apart from, or in conjunction with, the programming service provider 111. Such programming content may include content regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

In various embodiments, the service provider network 101 may include one or more video and/or audio processing modules (not shown) for acquiring and transmitting programming guide information and related content feeds (including content accessible over a data network) from the programming service provider 111, the television broadcast systems 123, the third-party content provider systems 125, or the servers 119 over one or more of the networks 101, 105, 107, to particular STBs 103a-103n. Accordingly, the service provider network 101 may include facilities to support compression/decompression, coding/decoding, modulation/demodulation, optical/electrical conversion, and analog/digital conversion, as well as any other suitable signal processing and/or transmission operation. Further, the service provider network 101 can optionally support end-to-end data encryption in conjunction with programming guide creation and related content streaming services such that only authorized users are able to access personalized programming guides and experience content reference therein.

Moreover, the network 101 may include an authentication module (not shown) configured to perform authorization/authentication services and determine whether users or content sources are indeed subscribers to, or providers of, the service. An authentication schema may require a user name and password, a key access number, a unique machine identifier (e.g., media access control (MAC) address), etc., as well as a combination thereof. Once a subscriber has authenticated a presence on the system 100, the user may bypass additional authentication procedures for executing later applications (e.g., programming content streaming instances). Data packets, such as cookies, may be utilized for this purpose. Thus, once an STB or content source is authenticated, connections between the STBs 103a-103n and the content sources may be established directly or through the programming service provider 111.

In other embodiments, authentication procedures on a first device (e.g., the STB 103a) may identify and authenticate a second device (e.g., the user device 106) communicatively coupled to, or associated with, the first device. Further, the authentication module may grant users the right to receive programming guide information and related content from multiple system 100 sources by revoking existing sets of digital certificates associated with a particular provider, and issuing new sets of digital certificates mapped to a second provider. In this regard, an STB (e.g., the STB 103a) may receive new programming content or guide information from a second source, whereas the previous session may be automatically closed when the "old" or prior certificates associated with the first source are revoked. This enables users to initiate secure sessions at any given STB 103a-103n (or the terminal 104) linked to the system 100, whether or not the STB (or a terminal) belongs to that individual user. It is additionally contemplated that multiple rights sessions may exist concurrently.

In particular embodiments, the programming service provider 111 may comprise an IPTV system configured to support the transmission of television video programs from the broadcast systems 123 as well as other content, such as content from the various third-party sources (e.g., 109, 119, 123, and 125) utilizing internet protocol (IP). That is, the IPTV system 111 may deliver programming guide information, signals and/or streams, including programming content accessible over a data network, in the form of IP packets. Further, the transmission network (e.g., the service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of programming guide information and related content. Delivery of video content, by way of example, may be through a multicast from the IPTV system 111 to the STBs 103a-103n. Any individual STB may tune to a particular content source by simply joining a multicast (or unicast) of the media content, utilizing an IP group membership protocol (IGMP). For instance, the IGMP v2 protocol may be employed for joining STBs to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the programming content may be provided to various IP-enabled devices, such as those computing, telephony, and mobile apparatuses previously delineated.

While the system 100 is illustrated in FIG. 1, the exemplary components are not intended to be limiting, and indeed, additional or alternative components and/or implementations may be utilized.

Although the content processing device is described with respect to an STB 103, it is contemplated that various embodiments have applicability to any device capable of processing video, audio, and/or multimedia streams.

Figure 2:
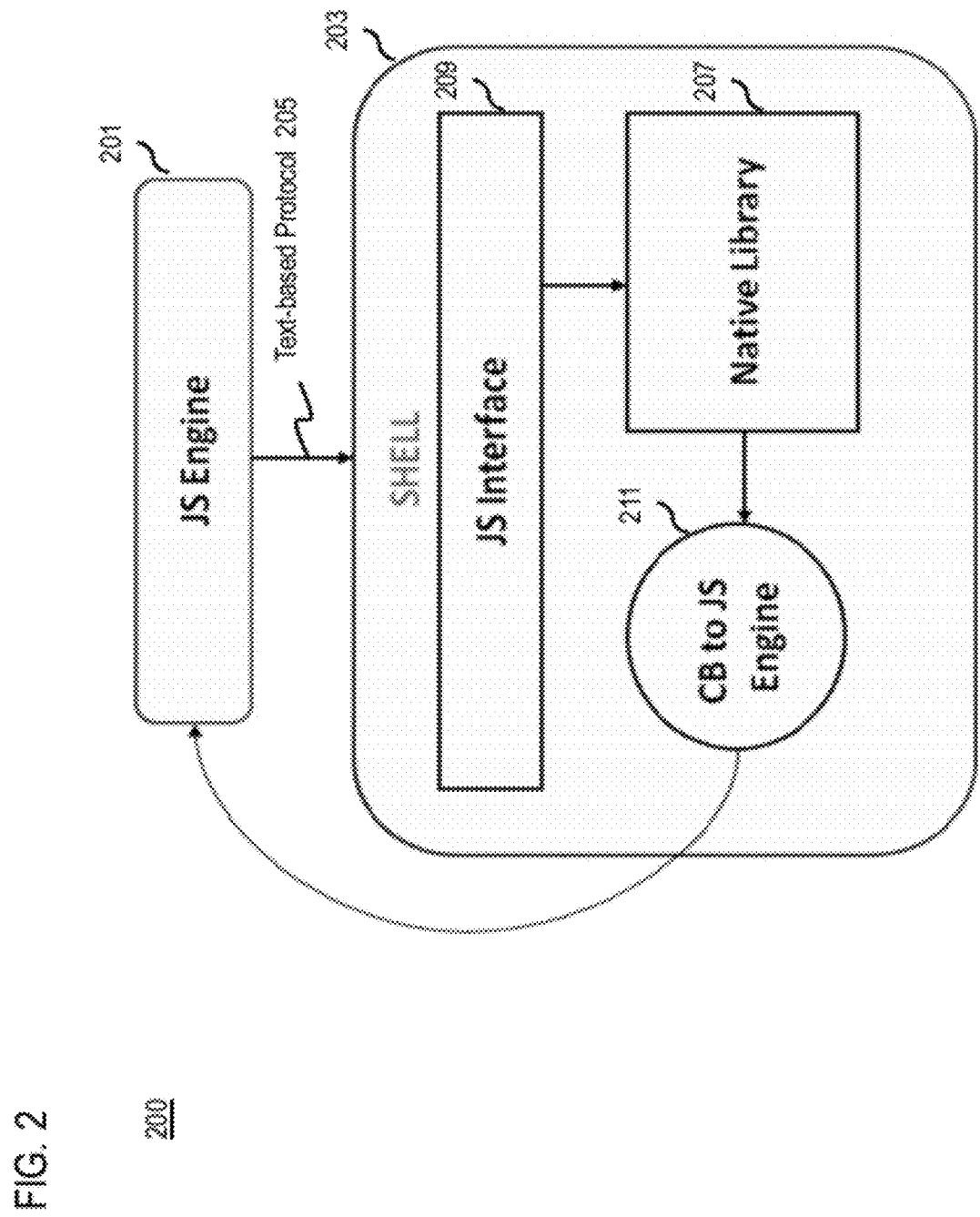
FIG. 2 is a functional diagram relating to the control of a user device native function via a web-based application, according to an exemplary embodiment.

FIG. 2 is a functional diagram relating to the control of a user device native function via a web-based application, according to an exemplary embodiment. The system 200 includes a web-based application engine 201, a shell application 203, and a communication protocol 205. In one embodiment, the web-based application engine 201 resides in a web page, and is designed to handle all the communications between the web-based application (e.g., in JavaScript (JS)) and native functions of the user device 106 (e.g., a mobile terminal). The web-based application engine 201 can be a software program that resides in a web-based application, such as a web browser, a web server, etc. The web-based application engine 201 interprets and executes the web-based application that complies with a hypertext markup language (HTML), a cascading style sheet (CSS), a scripting language, or a combination thereof. The scripting language may be JavaScript (JS), ECMA Script, etc. In one embodiment, the web-based application engine 201 organizes a web application in a windows-like fashion, such as deploying multiple windows to separate unrelated bits of information, data entry forms, etc. In another embodiment, the web-based application engine 201 runs multiple web-based applications (e.g., web video sharing, geo-caching, etc.) at the same time.

Modern web browsers typically provide a language for writing extensions to the browser itself, and several standard embedded languages for controlling the browser, including JavaScript (a dialect of ECMAScript), CSS, etc. By way of example, web browsers usually use a public application programming interface (API) to create "host objects" responsible for reflecting the document object model (DOM) into JavaScript. DOM is a cross-platform and language-independent convention for representing and interacting with objects in HTML, XHTML and XML. DOM allows applications where the document is accessed repeatedly or out of sequence order. Web servers expose host objects representing a HTTP request and response objects, and then manipulate to dynamically generate web pages, such as writing server-side code in a scripting language.

The shell application 203 can be a module in a core native application of the user device 106, and process the communications between the web-based application engine 201 and the native functions of the user device 106. In one embodiment, the shell application 203 is built around a native library 207 of native functions, which are accessible by the web-based application engine 201. The shell application 203 uses a communication protocol 205, which is text-based, to communicate with the web-based application engine 201. The shell application 203 exposes a web-based application (e.g., JavaScript) interface 209 for web pages to communicate with the native functions in the native library 207 and a callback mechanism 211 for communicating with the JS engine 201. The native library 207 handles the entire native calls to the native APIs exposed by the user device operation system. The native library 207 delivers the events to the appropriate JS callback APIs that are exposed.

A callback is a reference to a call, which is executable code, or a piece of executable code, that is passed as an argument to other code. This allows the web-based application engine 201 to call a subroutine (or a native function) defined in the native library 207. The JS Interface 209 is exposed by the shell application 203 for all the native API communication. The JS Interface 209 defines all the APIs required to communicate with the native library 207.

As evident from the above description, the shell application 203 invokes or "launches" a native function of the user device 106. In one embodiment, a callback is used to turn on or activate options of relevant native functions to the web-based application engine 201, thereby fine-tuning the native function at runtime. Also, the callback can be used to signal errors. The shell application 203 may support viewing of the native functions, the contents of directories, etc. Further, the shell application 203 may present to the user the native functions, the contents of directories, etc. as command lines and/or graphics.

As discussed, the web-based application engine 201 interacts with the native functions using the communication protocol 205. The web page that is enabled with the web-based application engine 201 can communicate with any native application that opens an interface for the scripting language. The communication protocol 205 is a text based protocol that defines text based commands for communication between endpoints.

By way of example, the communication protocol 205 is customized WiFiOS Text Protocol (WTP) that uses a Base64 encoding algorithm for transferring binary content between the web-based application engine 201 and the shell application 203. The protocol 205 supports transferring commands and payloads between the web-based application engine 201 and the shell application 203. For example, the protocol 205 supports transferring binary content between the web-based application engine 201 and the shell application 203 using the Base64 encoding algorithm.

The system 200 enables any web-based application to interact with the native functions of the user device 106 via the Java Script (JS) interface 209 using WTP. The system 200 is implemented on the user device 106 and acts as an interface between Java Script (JS) and native functions. Accordingly, the system 200 allows any Java Script (JS) to invoke the native functions of a user device 106.

Figure 3:
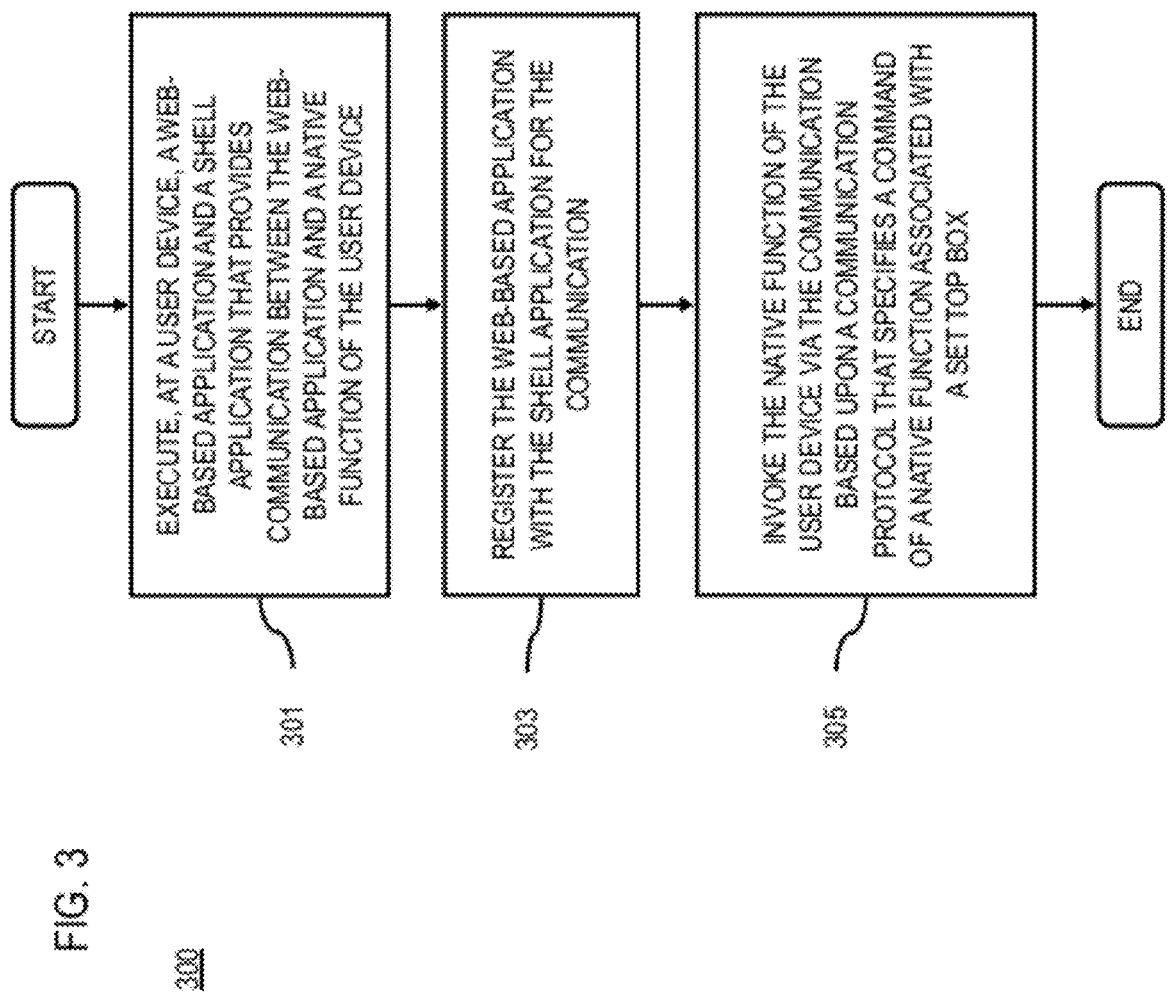
FIG. 3 is a flowchart of a process for executing a command for controlling a mobile terminal native function via a web-based application, according to an exemplary embodiment.

FIG. 3 is a flowchart of a process for executing a command for controlling a mobile terminal native function via a web-based application, according to an exemplary embodiment. Continuing with the example of FIG. 1, the user device 106, per step 301, executes a web-based application (e.g., the web-based application engine 201) and an application (e.g., the shell application 203) that provides communication between the web-based application and a native function of the user device 106 (e.g., a mobile terminal).

In step 303, the user device 106 registers the web-based application with the application for the communication. Details of the establishment of the communication channel are provided with respect to FIG. 4.

Thereafter, in step 305, the user device 106 invokes the native function of the mobile terminal via the communication based upon a communication protocol that specifies a command of a native function associated with a set top box. According to one embodiment, WTP provides device detection and bonding as well as handling of command messages and data messages. Advantageously, the WTP is designed to be simple, as to accommodate the constraints associated with portable (or mobile) devices; such devices are typically constrained by battery life and processing power.

Figure 4:
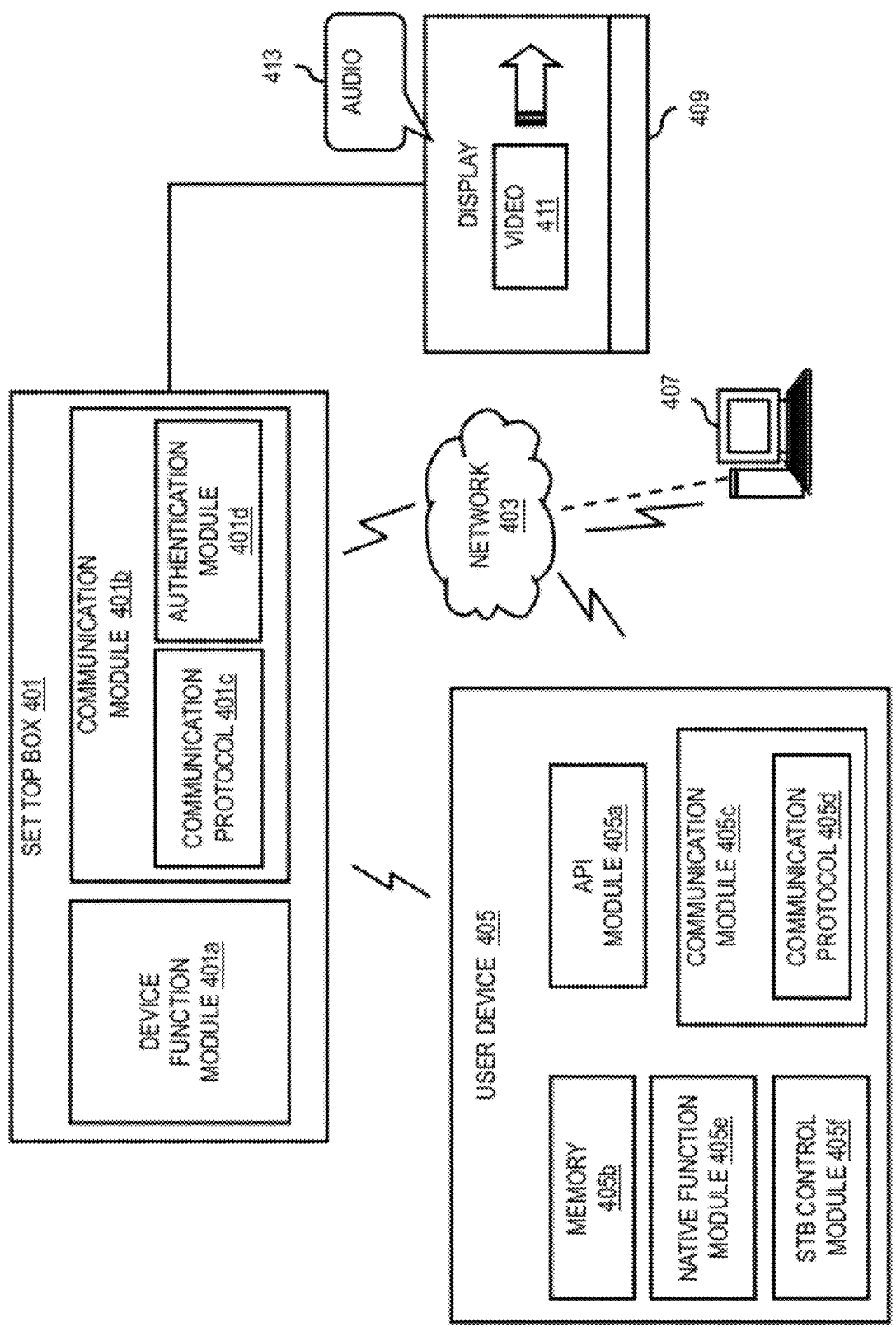
FIG. 4 is a diagram of a wireless environment in which a user device and a set top box interact to provide control over the set top box (STB) based on device native functions, according to an exemplary embodiment.

FIG. 4 is a diagram of a wireless environment in which a user device and a set top box interact to provide control over the set top box (STB) based on a user device native function, according to an exemplary embodiment. The STB 401 may utilize any suitable technology to receive commands and media data from the user device 405 (e.g., a mobile phone), as well as one or more content streams from a programming source, such as the IPTV system 111 of FIG. 1.

The STB 401 can include computing hardware (such as described with respect to FIG. 7) as well as additional components configured to provide services related to processing a device native function driven command. In addition, the STB 401 includes hardware and/or other components to support related functions and capabilities for viewing video assets (e.g., remote control capabilities, conditional access functions, tuning functions, presentation functions, multiple network interfaces, audio/video signal ports, etc.). The functions and operations of the STB 401 may be governed by a controller that interacts with each of the STB components to provide programming guide information and related content retrieved from an audio or video-sharing site, as well as from another STB device or component of the system 100. In turn, the user may be afforded greater functionality utilizing a control device to control the personalized programming guide service and related services, as will be more fully described below. As later explained, remote control functions can also be provided by the user device 405.

In one embodiment, the STB 401 is configured to communicate with one or more user devices 405, including: a computer device 407, laptops, PDAs, cellular phones, mobile devices, handheld devices, as well as any other equivalent technology capable of capturing and storing media. Moreover, the computer device 407, as a user device, can transfer media content to the STB 401 for presentation to a display 409.

Therefore, the STB 401 may be configured to provide an indicator that the STB 401 is being controlled by the user device 405 on (or at) the display 409. In one embodiment, presentation of the media (or content) may include: displaying, recording, playing, rewinding, forwarding, toggling, selecting, zooming, or any other processing technique that enables users to manipulate the media. For instance, the STB 401 may provide one or more signals to the display 409 (e.g., television) so that the display 409 may present the media, as images, audio, video, or any combination thereof. A communication interface (not illustrated) of the computer device 407 may be configured to retrieve the programming and content information over the data network (e.g., packet-based network 105), wherein the STB 401 may receive a programming content stream from the computer device 407 to present to the user via the display 409.

The STB 401 may also interact with a PVR, such as a digital video recorder (DVR), to store received content that can then be manipulated by a user at a later point in time. In various embodiments, the DVR may be network-based, e.g., included as a part of the service provider network 101, collocated at a subscriber site having connectivity to the STB 401, and/or integrated into the STB 401.

In this example, the STB 401 uses short range communication (e.g., Wi-Fi) to operate within a wireless local area network (LAN) 403 and to interact with a user device 405 (e.g., a mobile phone with Wi-Fi capability, PDA, etc.). The network 403 provides connectivity among the user device 405 and a computer device 407. The coverage of one or more short range access can comprise an area as small as a few rooms or as large as many square miles. Coverage in the larger area may depend on a group of access points with overlapping coverage. Additionally (or alternatively), user device 405 communicates directly with set-top box 401 using infrared or short range communication technologies.

In one embodiment, the STB 401 connects to the network 403 via the user device 405. Many mobile communication device platforms support wireless connections via tethering. Tethering is the use of a mobile device with Internet access such as 3G cellular service to serve as an Internet gateway or access point for other devices.

These arrangements enable use of the user device 405, for example, as a remote control device for the computer device 407 and the set top box 401. Such an environment can support devices, that are Wi-Fi enabled or wired (e.g., via an Ethernet cable), such as the computer device 407 to connect to the network 403, either directly or through another network component such as a router.

The STB 401 includes a device function module 401a configured to operate with a communication module 401b to permit control signals related to device native functions sent from the user device 405 and the computer device 407 to be processed at the STB 401, such as device native functions or application events. The communication module 401b is configured to receive content streams from a programming service provider, the computer device 407, a server (not shown), or other programming content source, such as media source.

As shown, the STB 401 outputs to a display 409 and/or the computer device 407. In an exemplary embodiment, the display 409 may be configured with internet protocol (IP) capability (i.e., includes an IP stack, or is otherwise network addressable), such that the functions of the STB 401 may be assumed by the display 409. In this manner, an IP ready, HDTV display or DTS-HD audio system may be directly connected to one or more service provider networks 101, packet-based networks 105, and/or telephony networks 107. Although the STB 401 and the display 409 are shown separately, it is contemplated that these components may be integrated into a single component, or other combination of components.

In one embodiment, the device function module 401*a* receives commands from the user device 405. The commands are generated in response to one or more calls for native functions of the user device 405 that were activated via a web-based application at the user device 405. The calls are processed by a native function module 405*e* of the user device 405. The device function module 401*a*, among other functions, is responsible for "listening" to incoming requests devices 405, 407, and to determine whether devices 405, 407 are authorized to control the STB 401. Although not shown, the computer device 407 may also include a STB control module for generating control signals to the STB 401 in response to one or more calls for native functions thereof, for instance, associated with native functions of the STB 401.

An authentication module 401*d* may be provided in the communication module 401*b* of the STB 401 to initiate or respond to authentication schemes of, for instance, the service provider network 101 or various other content providers, e.g., broadcast television systems, the third-party content provider systems 125, or the servers 119. The authentication module 401*d* may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at the STB 401 may identify and authenticate a second device (e.g., the computer device 407) communicatively coupled to, or associated with, the STB 401, or vice versa. Further, authentication information may be stored locally at memory, in a repository (not shown) connected to the STB 401, or at a remote repository, e.g., a user profile repository.

The authentication module 401*d* may also facilitate the reception of data from single or disparate sources. For instance, the STB 401 may receive broadcast video from a first source (e.g., the IPTV system 111), signals from a second source (e.g., the server 119), and a programming content stream from a third source accessible over a data network (e.g., the content repository 109). As such, the display 409 may present the broadcast video and programming content stream to the user. This presentation may be experienced separately, concurrently, in a toggled fashion, or with zooming, maximizing, minimizing, or trick capabilities, or equivalent mode.

The user device 405 includes an API module 405*a*. The API module 405*a* supports user access to the user device 405 in order to remotely, e.g., control or configure one or more web-based applications at the user device 405. For example, the API(s) may be remotely activated in order to open an image-sharing website so as to download (or backup) user-generated images at the user device 405 or a networked repository, such as a tracking content repository.

The API module 405*a* also supports a user to erase data from a memory 405*b* of the user device 405, such as for the purpose of removing check-out e-books after finishing reading, purging personal or otherwise sensitive information, etc. Still further, the API module 405*a* supports remotely activating API(s) to configure features of or services available to the user device 405, such as to monitor or deactivate an ability of the user device 405 to transmit and receive information (e.g., STB commands or STB associated commands, etc.). For instance, control signals may be transmitted to the user device 405 from the computer device 407, an external service platform (e.g., the programming service provider 111, the third-party television broadcast systems 123, the third-party content provider systems 125, and servers 19, etc.) in order to control the user device 405 to transmit STB commands to the STB 401. As another example, the computer device 407 and/or the platform is requested by a user to monitor usage of the user device 405 and, thereby, provide a "log" of such use.

According to exemplary embodiments, the user device 405 may include one or more application protocol interfaces (API), such as a set of APIs included within, for example, a binary runtime environment for wireless (BREW) platform, for receiving control signals from the platform and, thereby, for being remotely activated, controlled, configured, monitored, tracked, etc., by the platform. It is contemplated, however, that one or more other mobile client applications may be utilized, such as one or more applications written in one or more programming languages, such as C, C++, J2ME, Java, etc. As such, API(s) may be configured to, in response to control signals being received from, for instance, the platform, enable one or more signals to be captured from an audio interface (e.g., a microphone) or an imaging interface (e.g., a camera) of the user device 405. These signals may relate to acoustic(s) or image(s) of an environment surrounding the user device 405. In other instances, API(s) may determine spatial positioning, backup or erase a memory (not shown), configure (or reconfigure) functions, obtain usage logs, terminate services, etc., of or associated with the user device 405.

Additionally, the user device 405 includes a communication module 405*c* (executing a communication protocol 405*d*). Furthermore, the user device 405 includes a native function module 405*e* that provides conversion (or translation) and commands from the web-based application in a text-based protocol into binary data user for controlling the STB 401 to perform certain actions. These actions relate to various STB functions, e.g., channel control, volume control, muting, search, etc. The module 405*d* can translate, in one embodiment, the WiFiOS commands into STB commands.

To coordinate the processing of calls for device native functions, the user device 405 and the STB 401 employ communication protocol 405*c* and 401*c*, respectively, to create a communication channel for transport of data messages as well as command (or control) messages. As more fully described below, the communication protocol can utilize transport protocols, such as Transmission Control Protocol (TCP) or User Datagram Protocol (UDP) over Internet Protocol (IP). As shown, upon execution of a command stemming from a call for a device native function, presentation of video 411 and audio 413 can be altered, and may later be restored.

The communication is established between the user device 405 and the set top box 401 as follows. In this example, the user device 405 and the STB 401 are assigned a User ID and password (or passcode) after authentication. As shown, the user device 405 is referred to as a "broadcasting device," while the STB 401 is the "broadcasting receiver device." For instance, when the broadcast receiver 401 decides to communicate with the broadcasting device 405, the receiver 401 establishes a communication channel (e.g., TCP session or channel) with the broadcasting device 405. If the connection is not authenticated using, for example, an initial hand shaking within a predetermined period (e.g., 120 seconds) of the connection being opened, the connection is closed. When the connection is accepted by the device 405, the device 405 challenges with the initial hand shaking request. In one embodiment, the common (or least) capabilities transmitted during the above hand shaking negotiation process can be used as the session capability for the whole session. If the session capability rules are violated by any command, such rules can be responded with a "Not Supported" response.

For detecting STBs, the user device 405 generates via the communication module 405c a message, e.g., a UDP broadcast message, for transmission to STB 401. A proprietary protocol, in certain embodiments, provides for binding and listening on predetermined port for both the TCP and UDP packets. In certain embodiments, the communication between the user device and STB is facilitated by a simple and extensible transmission protocol.

The device that does not want to be detected need not start a UDP server. Similarly in the case in which a device does not want to support the detection mechanism (and only wants to be an originator all the time), such device also need not start the TCP server. If a device wants to support the detection mechanism (and only wants to be the terminator), the particular device need not start the TCP server, but needs to start the UDP server.

The STB 401 can listen on the same port for both the TCP and UDP packets. When an originating device wants to detect other responders, such device generates the UDP broadcasting packets. Upon detection of this broadcast message, the STB 401 initiates establishment of a TCP connection, using the handshaking procedure. For sending commands (e.g., relates to presentation of a web-sharing video clip by the STB 401, a communication channel (e.g., a TCP connection) is established using the handshaking mechanism. For authenticating a user device, the SHA family of algorithms (SHA-1) is employed for the encryption.

In one embodiment, the memory 405b stores preferences relating the device native function-based STB control service; such preferences can be conveyed to the STB 401 via any type of wired and/or wireless link, e.g., infrared, radio frequency (RF), BLUETOOTH™, and the like. Thus, the STB 401 may store user preferences with respect to the parameters associated with the device native function-based STB control service. Alternatively, user preferences may be tracked, recorded, or stored in a network user profile repository 121. The preferences may be automatically retrieved and activated by a user at any time. It is noted that the user device 405 may be separate from the STB 401 or may be integrated within the STB 401 (in which case certain input interface hardware and/or software may not be necessary).

Thus, under the above arrangements of FIG. 4, a web-based application activated at the user device 405 can conveniently invoke native functions of the user device 405 to permit control of the STB 401 during deploying the web-based application.

FIG. 5 is a flowchart of a process for controlling, via a wireless user device, a function of a set top box, according to an exemplary embodiment. For the purposes of illustration, this process is described with respect to FIG. 4 involving a video-sharing website. When the video-sharing website is activated at the user device 405, the device 405 automatically (without user input or involvement) registers the web-based video sharing application with the shell application. Thereafter, a video clip is being downloaded at the wireless user device 405, which involves a call for a device native function for media playing. The registration allows the web-based video sharing application to communicate with a device native library so as to call a device native function to play the media. The device native function then responds with a callback.

In one embodiment, the web-based application initiates the call to the application for the communication, encodes text-based data (including a command, data, content item, or a combination thereof) into binary data to communicate the call, and transmits the binary data between the web-based application and the native function of the mobile terminal 405 to invoke the native function (per steps 501-505). The native function of the mobile terminal 405 may be associated with a calendar application, a contacts application, a camera, a global positioning system, an accelerometer, local storage, or a combination thereof. The communication protocol is text based, and the web-based application complies with a hypertext markup language, a cascading style sheet, a scripting language, or a combination thereof.

The device native function, via module 405e, issues a command to the STB 401, per step 507. The command may specify any number of instructions: retrieval of a list of available set top boxes, sending a list of available set top boxes, establishing a connection to one or more set top boxes, sending one or more remote control commands to one or more set top boxes, pushing one or more media content items to one or more set top boxes, retrieving favorite channel information, retrieving a list of media content items available at one or more set top boxes, or a combination thereof.

By way of example, the STB 401 invokes a transmission/download function, thereby controlling the download of the video clip to the display 411 or to the computer device 407. Once the video clip is transmitted and/or downloaded, the web-based video sharing application invokes another native function of the mobile device 405 to transmit a play command to the STB 401, which correspondingly controls the STB 401 to instruct the display 409 or the computer device 407 to play the transmitted/downloaded video clip.

The call for a device native function may trigger other actions, in addition to transmit/download video clips, such as pausing of the video clip, inserting subtitles/comments/reviews/etc. Into the video clip. In other embodiments, the call for a device native function is mapped to multiple actions to be performed by the STB 401. Thereafter, the shell application unregisters the web-based application and deletes the web-based application from the mobile terminal (step 509).

The above process of FIG. 5 involves the interaction among the STB 401 and the user devices 405 and 407 using a predetermined protocol that is optimized for the exchange of information in the context of controlling STB 401. According to certain embodiments, the protocol is termed the WiFiOS Text Protocol (WTP), as more fully described below.

Figure 6A:
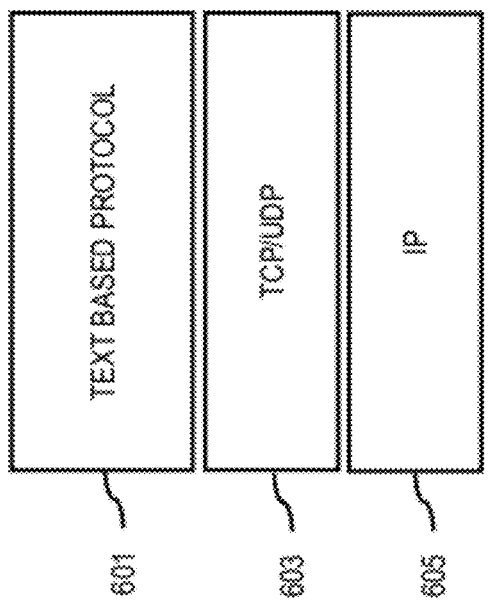
FIGS. 6A and 6B are diagrams of a communication protocol and associated messaging formats for controlling STB functions based on device native functions, according to various embodiments.
Figure 6B:
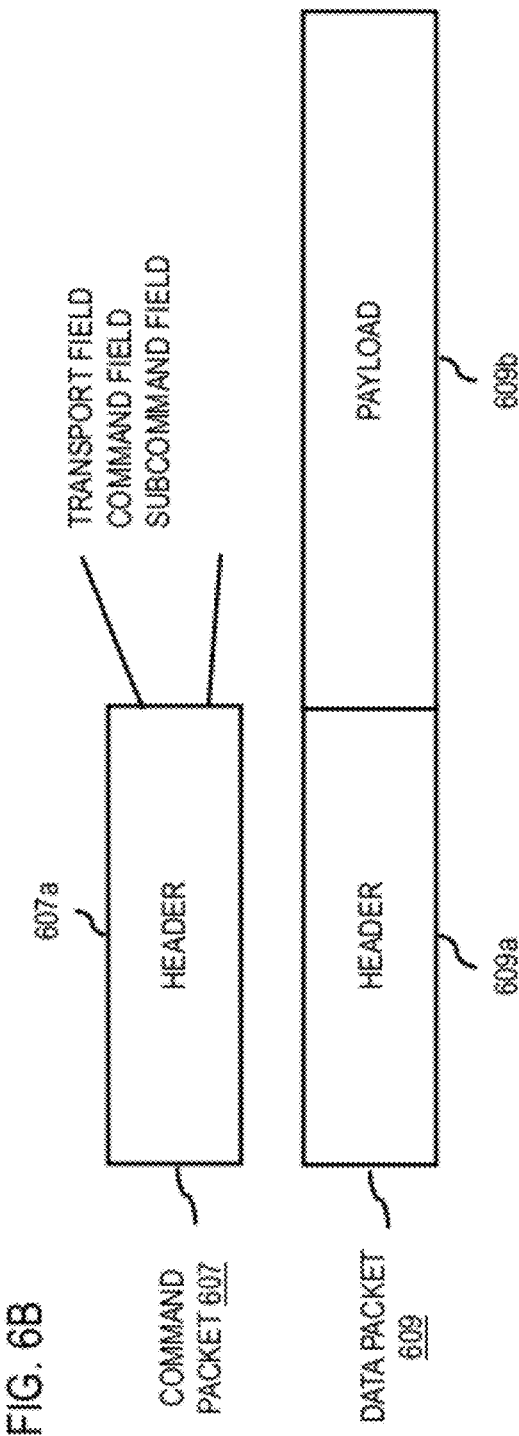

FIGS. 6A and 6B are diagrams of a communication protocol and associated messaging formats for controlling STB functions based on device native functions invoked via a web-based application at a user device, according to various embodiments. As shown in FIG. 6A, in certain embodiments, a WiFiOS Text Protocol (WTP) 601 operates above a Transmission Control Protocol (TCP) or User Datagram Protocol (UDP) layer 603. Also, the Internet Protocol (IP) 605 can be utilized. These protocols 601-605 can configured to operate in a variety of wireless transport environments. For the purposes of illustration, the WTP 601 is explained with respect to a Wi-Fi environment.

In one embodiment, the WTP 601 is a text-based protocol that resides within the web-based application layer (of the Open System Interconnect (OSI) model). The WTP 601 can be used to send various commands and command related information along with command data. The WTP 601 utilizes predefined command headers, thereby advantageously requiring less processing time. Also, this protocol is efficient as the commands are pre-defined and the decoding can be simple. Further, the WTP 601 is fast, in that the processing of the commands follow different logical branches for different commands.

As mentioned, the WTP 601 can be configured to support different transport mechanisms. For instance, the addition of new transport mechanisms and associated commands can be readily accommodated. The commands and data to be transferred are secure in that the WTP 601 is session based.

The WTP 601 can be used to invoke different native functions and native applications at the user device. Although the WTP 601 is primarily described herein for the communication between the web-based application engine and the shell application, the WTP 601 can also be used to communicate between any other applications/devices/PCs to transfer commands and data. The hybrid mobile application architecture developed based on the WTP combines the power of HTML5 and native APIs functionality, thereby achieving the mobile remote functionality in user devices. As discussed, the engine 201 (of FIG. 2) acts as a bridge between the web-based application such as in HTML5 and the shell application. The engine 201 initiates all the calls to the shell application and handles all the callbacks from the shell application and performs necessary actions based on the event delivered from the shell application to the engine. The shell application 203 is the layer between the JS engine 201 and the native APIs. The shell application handles all the requests from the JS engine. Based on the request, the shell application initiates calls to appropriate native APIs.

As depicted in FIG. 6B, a command message (or referred to as command packet in the case of IP) 607 includes a header. A data message (data packet) includes a header 609a and a payload 609b. This header is used to carry all the commands, data and events. By way of example, the header include a Protocol Identifier (ID) field, a Protocol Version field, a Protocol Subversion field, a Command field identifies the command carried by the protocol, a Command Sequence field denotes the sequence number of the packet sent, a Time Stamp field, a From Info field, a Payload Length field, etc. There need not be any constraint on format or the manner in which the payload is manipulated and handled. The payload data can be specified in the name, length and value pair, for example. In this manner, the WTP 601 can accommodate different proprietary headers and different objects at the same time.

The WTP defines commands for communication between the JS engine and the native APIs. Base64 encoding format is used for sending the binary data to the shell application to the APIs and also from the shell application to the JS engine.

Regarding command packets and data packets (shown in FIG. 6B), as mentioned, packets that have only headers are defined as command packets. If the packet has both the header and payload data, these packets are designated as data packets. According to some embodiments, the payload of the data packets follow the NLV (Name, Length and Value order) structure.

In WTP 601, the formats of a request, a response, and an event are defined with keywords and strings as follows as examples in Table 1:

TABLE 1

```
WiFiOS:(REQUEST/RESPONSE/EVENT);
REQUEST = (REGISTER/UNREGISTER/
IS_WIFI_CONNECTED/
    IS_APPPIN_AVAILABLE/STORE_APPPIN/
    STB_LIST/
        CONNECT/RETRY
        /REMOTE/GET_META_DATA/GET_MEDIA_LIST)
RESPONSE =
    (REGISTER_RESPONSE/UNREGISTER_RESPONSE/
        IS_WIFI_CONNECTED_RESPONSE/
        REMOTE_RESPONSE/STB_LIST_RESPONSE/
        CONNECT_RESPONSE /RETRY_RESPONSE/
        IS_APPPIN_AVAILABLE_RESPONSE
        /STORE_APPPIN_RESPONSE/
```

TABLE 1-continued

```
        GET_META_DATA_RESPONSE/
        GET_MEDIA_LIST_RESPONSE)
EVENT = ON_EVENT
```

The WTP 601 defines the format of a REGISTER command for registering the JS engine with the shell application as follows in Table 2. This command initializes the shell application. An example of such command is as follows: "WiFiOS:REGISTER:MobileRemote1". APPID is an application identifier used for differentiating the applications registered with the shell application, and * defines that length of the (ALPHA/DIGIT) is not fixed.

TABLE 2

```
REGISTER = REGISTER:APPID;
APPID = (ALPHA / DIGIT)*
```

The WTP 601 also defines an UNREGISTER command as follows in Table 3, which is used for unregistering the JS engine 201 with the shell application 203. A shell middleware cleanup will happen after this API call. An example of such command is as follows: "WiFiOS:UNREGISTER:MobileRemote1:1". APPID is an application identifier used for differentiating the applications registered with the shell application. SID is a SessionId that was generated using REGISTER command. * defines that length of the (ALPHA/DIGIT) is not fixed.

TABLE 3

```
UNREGISTER = UNREGISTER:APPID:SID;
APPID = (ALPHA / DIGIT)*
SID = DIGIT*
```

Further, an IS_WIFI_CONNECTED command is defined in the WTP 601 as follows in Table 4 for checking Wi-Fi connectivity. An example of such command is as follows: "WiFiOS: IS_WIFI_CONNECTED:1". SID is a SessionId that was generated using REGISTER command. * defines that length of the (ALPHA/DIGIT) is not fixed.

TABLE 4

```
IS_WIFI_CONNECTED = IS_WIFI_CONNECTED:SID;
SID = DIGIT*
```

Further, an IS_APPPIN_AVAILABLE command is defined in the WTP 601 as follows in Table 5 for checking if the App pin is available in the profile maintained by the shell middleware. An example of such command is as follows: "WiFiOS:IS_APPPIN_AVAILABLE:1". SID is a SessionId that was generated using REGISTER command. * defines that length of the (ALPHA/DIGIT) is not fixed.

TABLE 5

```
IS_APPPIN_AVAILABLE = IS_APPPIN_AVAILABLE:SID;
SID = DIGIT*
```

A STORE_APPPIN command is defined in the WTP 601 as follows in Table 6 for storing the App pin in the profile maintained by the shell middleware. An example of such command is as follows: "WiFiOS: STORE_APPPIN:1: 5678". SID is a SessionId that was generated using REGISTER command. APPPIN is a 4 digit app pin entered by the user in the application. The App pin will be generated on the TV. * defines that length of the (ALPHA/DIGIT) is not fixed.

TABLE 6

STORE_APPPIN = STORE_APPPIN:SID:APPPIN;
SID = DIGIT*
APPPIN = 4DIGIT

A STB_LIST command is defined in the WTP 601 as follows in Table 7 for getting a list of available set top boxes. An example of such command is as follows: "WiFiOS: STB_LIST:1". SID is a SessionId that was generated using REGISTER command. * defines that length of the (ALPHA/DIGIT) is not fixed.

TABLE 7

STB_LIST = STB_LIST:SID;
SID = DIGIT*

A CONNECT command is defined in the WTP 601 as follows in Table 8 for connecting to STB in profile if available. An example of such command is as follows: "WiFiOS: CONNECT:1". SID is a SessionId that was generated using REGISTER command. * defines that length of the (ALPHA/DIGIT) is not fixed.

TABLE 8

CONNECT = CONNECT:SID;
SID = DIGIT*

A STORE_APPPIN command is defined in the WTP 601 as follows in Table 9 for connecting to previous connected STB. This command has to be used only when an existing STB connection is disconnected. An example of such command is as follows: "WiFiOS: RETRY:1". SID is a SessionId that was generated using REGISTER command. * defines that length of the (ALPHA/DIGIT) is not fixed.

TABLE 9

RETRY = RETRY:SID;
SID = DIGIT*

A Remote Command is defined in the WTP 601 as follows in Table 10 for sending the remote control commands to the STB. A response to this type of command is not needed (fire and forget). An example of the Remote Control Command is "WiFiOS: REMOTE:1: RC_KEY_POWER". SID is a SessionId that was generated using REGISTER command. * defines that length of the (ALPHA/DIGIT) is not fixed.

TABLE 10

REMOTE = REMOTE:SID:COMMAND;
SID = DIGIT*
COMMAND = ALPHA*

Keys for remote control are listed om Table 11 as follows:

TABLE 11

RC_KEY_POWER
RC_KEY_MUTE
RC_DEVICEKEY_STB
RC_DEVICEKEY_AUX

TABLE 11-continued

RC_DEVICEKEY_DVD
RC_DEVICEKEY_TV
RC_KEY_MENU
RC_KEY_GUIDE
RC_KEY_INFO
RC_CONTROL_UP
RC_CONTROL_DOWN
RC_CONTROL_LEFT
RC_CONTROL_RIGHT
RC_CONTROL_OK
RC_KEY_EXIT
RC_KEY_OPTIONS
RC_KEY_WIDGETS
RC_KEY_ONDEMAND
RC_KEY_FAVOURITES
RC_KEY_JUMP
RC_KEY_FIOSTV
RC_KEY_CHANNELUP
RC_KEY_CHANNELDOWN
RC_KEY_VOLUMEUP
RC_KEY_VOLUMEDOWN
RC_KEY_SKIPBACK
RC_KEY_SKIPFORWARD
RC_KEY_DVR
RC_KEY_PLAY
RC_KEY_STOP
RC_KEY_PAUSE
RC_KEY_FORWARD
RC_KEY_BACKWARD
RC_KEY_REC
RC_KEY_1
RC_KEY_2
RC_KEY_3
RC_KEY_4
RC_KEY_5
RC_KEY_6
RC_KEY_7
RC_KEY_8
RC_KEY_9
RC_KEY_0
RC_KEY_ASTERISK
RC_KEY_HASH
RC_CONTROLKEY_A
RC_CONTROLKEY_B
RC_CONTROLKEY_C
RC_CONTROLKEY_D
RC_KEY_INPUT
RC_KEY_PIP
RC_KEY_PIPCHANGE

A REGISTER_RESPONSE Command is defined in the WTP 601 as follows in Table 12 for sending the response to the command REGISTER. An example of such Command is "WiFiOS: REGISTER_RESPONSE:0:SUCCESS". RESPONSE_DESCRIPTION contains the response code and the response description. RESPONSE_CODE takes 0 for Success and 1 for Failure. RESPONSE_DESC takes the strings "SUCCESS/FAILURE". * defines that length of the (ALPHA/DIGIT) is not fixed.

TABLE 12

REGISTER_RESPONSE =
REGISTER_RESPONSE:RESPONSE_DESCRIPTION;
RESPONSE_DESCRIPTION =
RESPONSE_CODE:RESPONSE_DESC
RESPONSE_CODE = DIGIT*
RESPONSE_DESC = ALPHA*

A UNREGISTER_RESPONSE Command is defined in the WTP 601 as follows in Table 13 for sending the response to the command UNREGISTER. An example of such Command is "WiFiOS: REGISTER_RESPONSE:0:SUCCESS". RESPONSE_DESCRIPTION contains the response code and the response description. RESPONSE_CODE takes 0 for Success and 1 for Failure. RESPONSE_DESC takes the strings "SUCCESS/FAILURE". * defines that length of the (ALPHA/DIGIT) is not fixed.

TABLE 13

```
UNREGISTER_RESPONSE =
UNREGISTER_RESPONSE:RESPONSE_DESCRIPTION;
RESPONSE_DESCRIPTION =
RESPONSE_CODE:RESPONSE_DESC
RESPONSE_CODE = DIGIT*
RESPONSE_DESC = ALPHA*
```

An IS_WIFI_CONNECTED_RESPONSE Command is defined in the WTP 601 as follows in Table 14 for sending the response to the command IS_WIFI_CONNECTED. An example of such Command is "WiFiOS:IS_WIFI_CONNECTED_RESPONSE:0:SUCCESS". RESPONSE_DESCRIPTION contains the response code and the response description. RESPONSE_CODE takes 0 for Success and 1 for Failure. RESPONSE_DESC takes the strings "SUCCESS/FAILURE". * defines that length of the (ALPHA/DIGIT) is not fixed.

TABLE 14

```
IS_WIFI_CONNECTED_RESPONSE =
IS_WIFI_CONNECTED_RESPONSE:RESPONSE_DESCRIPTION;
RESPONSE_DESCRIPTION =
RESPONSE_CODE:RESPONSE_DESC
RESPONSE_CODE = DIGIT*
RESPONSE_DESC = ALPHA*
```

A STB_LIST_RESPONSE Command is defined in the WTP 601 as follows in Table 15 for sending the list of available set top boxes. An example of such Command is "WiFiOS:STB_LIST_RESPONSE:[STB1:STB2]". STB_LIST_ARRAY contains the list of STB's in an array.

TABLE 15

```
STB_LIST_RESPONSE =
STB_LIST_RESPONSE:STB_LIST_ARRAY;
STB_LIST_ARRAY = [APLHA:APLHA:ALPHA]
```

An IS_APPPIN_AVAILABLE_RESPONSE Command is defined in the WTP 601 as follows in Table 16 for sending the response to the command IS_APPPIN_AVAILABLE. An example of such Command is "WiFiOS:IS_APPPIN_AVAILABLE RESPONSE:0:SUCCESS". RESPONSE_DESCRIPTION contains the response code and the response description. RESPONSE_CODE takes 0 for Success and 1 for Failure. RESPONSE_DESC takes the strings "SUCCESS/FAILURE". * defines that length of the (ALPHA/DIGIT) is not fixed.

TABLE 16

```
IS_APPPIN_AVAILABLE_RESPONSE =
IS_APPPIN_AVAILABLE
RESPONSE:RESPONSE_DESCRIPTION;
RESPONSE_DESCRIPTION =
RESPONSE_CODE:RESPONSE_DESC
RESPONSE_CODE = DIGIT*
RESPONSE_DESC = ALPHA*
```

A STORE_APPPIN_RESPONSE Command is defined in the WTP 601 as follows in Table 17 for sending the response to the command STORE_APPPIN. An example of such Command is "WiFiOS:STORE_APPPIN_ RESPONSE:0:SUCCESS". RESPONSE_DESCRIPTION contains the response code and the response description. RESPONSE_CODE takes 0 for Success and 1 for Failure. RESPONSE_DESC takes the strings "SUCCESS/FAILURE". * defines that length of the (ALPHA/DIGIT) is not fixed.

TABLE 17

```
STORE_APPPIN_RESPONSE = STORE_APPPIN_
RESPONSE:RESPONSE_DESCRIPTION;
RESPONSE_DESCRIPTION =
RESPONSE_CODE:RESPONSE_DESC
RESPONSE_CODE = DIGIT*
RESPONSE_DESC = ALPHA*
```

A CONNECT command is defined in the WTP 601 as follows in Table 18 for delivering the Wi-Fi connected event to the web-base application engine. An example of such command is as follows: "WiFiOS: ON_EVENT:101:Network Connected". EVENT_DESCRIPTION contains the event code and the event description. EVENT_CODE takes the event code values defined in the event table. EVENT_DESC takes the event description defined in the event table. * defines that length of the (ALPHA/DIGIT) is not fixed.

TABLE 18

```
ON_EVENT = ON_EVENT:EVENT_DESCRIPTION;
EVENT_DESCRIPTION = EVENT_CODE: EVENT_DESC
EVENT_CODE = DIGIT*
EVENT_DESC = ALPHA*
```

Events are listed in Table 19 as follows:

TABLE 19

| Event | EventDescription |
|---|---|
| 1 | General Error |
| 2 | Application not registered |
| 3 | Session not found |
| 4 | Session not active |
| 5 | Invalid operation on session |
| 6 | Invalid argument |
| 7 | Invalid network information |
| 8 | Invalid device information |
| 9 | Network Detection Error |
| 10 | Device Detection Error |
| 11 | Invalid image type |
| 12 | No resources available |
| 13 | Wi-Fi not supported |
| 14 | Wi-Fi Disconnected |
| 15 | Maximum limit reached |
| 16 | Device Disconnected |
| 17 | Could not connect |
| 18 | STB not selected for operation |
| 19 | Device details not found |
| 20 | Failed to read from profile |
| 21 | Failed to keep Wifi On |
| 22 | Failed to register for Wifi Events |
| 23 | Error sending command |
| 24 | Failed to add to profile |
| 25 | Read registry failed |
| 100 | General Success |
| 101 | Network Connected |
| 102 | Device connected |
| 201 | Wifi Turning ON |
| 202 | Wifi Turned ON |
| 203 | Wifi Turning OFF |
| 204 | Wifi Turned OFF |
| 205 | Scanning Wifi Networks |
| 206 | Wifi Network Connecting |
| 207 | Wifi Network Disconnecting |
| 220 | Different Wifi Network Network |
| 208 | Searching for STBs |

TABLE 19-continued

| Event | EventDescription |
|---|---|
| 209 | Authenticating STB |
| 210 | Authenticated STB Successfully |
| 211 | Authentication Failure |
| 212 | Displaying Logo |
| 213 | Importing Categories from STB |
| 214 | Importing All Channels from STB |
| 215 | Importing Favorites from STB |
| 216 | Updating all channels information to profile |
| 217 | Updating favorites information to profile |
| 218 | Retrieving all channels info from profile |
| 219 | Retrieving favorites info from profile |
| 220 | Unable to Fetch Channels from STB |
| 221 | AllChannels downloaded and extracted |

A STORE_APPPIN command is defined in the WTP 601 as follows in Table 20 for connecting to previous connected STB. This command is used when an existing STB connection is disconnected. An example of such command is as follows: "WiFiOS: RETRY:1". SID is a SessionId that was generated using REGISTER command. * defines that length of the (ALPHA/DIGIT) is not fixed.

TABLE 20

RETRY = RETRY:SID;
SID = DIGIT*

A PHOTOPUSH command is defined in the WTP 601 as follows in Table 21 for pushing the photos on to the STB. The binary has to be converted into ASCII content using the Base64 encoding algorithm. An example of such Command is "WiFiOS: PHOTOPUSH:3:afh:FALSE". The API doesn't return any response (fire and forget). DATA contains three parts. First part contains the length of the data that is passed. Second part contains the binary content that is converted into textual data using Base64 encoding algorithm. Third part contains the flag. CONTINUATION_FLAG takes TRUE when there is data still coming and False when the data is over. * defines that length of the (ALPHA/DIGIT) is not fixed.

TABLE 21

PHOTOPUSH = PHOTOPUSH:DATA;
DATA = DIGIT:1024ALPHA:CONTINUATION_FLAG:
CONTINUATION_FLAG = ALPHA*

A GETTVFAVORITES command is defined in the WTP 601 as follows in Table 22 for retrieving the TV Favorite channel info. An example of such command is as follows: "WiFiOS: GETTVFAVORITES:0". FAVORITES OPTION passes the value 0 for getting the Favorites from STB, and passes the value 1 for getting the Favorites from local db. * defines that length of the (ALPHA/DIGIT) is not fixed.

TABLE 22

GETTVFAVORITES = GETTVFAVORITES:
FAVORITES_OPTION;
FAVORITES_OPTION = DIGIT*

A GETTVFAVORITES_RESPONSE command is defined in the WTP 601 as follows in Table 23 for sending the Favorites information to the web-based application engine. An example of such command is as follows: "WiFiOS: GETTVFAVORITES_RESPONSE:2:CNN:100:20:BBC:200:223". CHANNELINFO contains first part as CHANNELINFO_SIZE and second part as CHANNELINFO_DATA. CHANNELINFO_SIZE defines the number of CHANNEL_DATA_SET that is going to be followed. CHANNELINFO_DATA contains n number of CHANNEL_DATA_SET. CHANNEL_DATA_SET contains CHANNEL_NAME, CHANNEL_NUMBE, and CHANNEL_LOGO_ID as the first, second and third parameters. "*" defines that length of the (ALPHA/DIGIT) is not fixed.

TABLE 23

GETTVFAVORITES_RESPONSE =
GETTVFAVORITES_RESPONSE:CHANNELINFO;
CHANNELINFO =
CHANNELINFO_SIZE:CHANNELINFO_DATA
CHANNELINFO_SIZE = DIGIT*
CHANNELINFO_DATA = n*CHANNEL_DATA_SET
CHANNEL_DATA_SET =
CHANNEL_NAME:CHANNEL_NUMBER:CHANNEL_LOGO_ID
CHANNEL_NAME = ALPHA*
CHANNEL_NUMBER = DIGIT*
CHANNEL_LOGO_ID = DIGIT*

A GET_MEDIA_LIST command is defined in the WTP 601 as follows in Table 24 for getting the list of the media content available. An example of such command is as follows: "WiFiOS: GET_MEDIA_LIST:AUDIO". MEDIA_TYPE defines the type of the media for which the request is made. The MEDIA_TYPE can hold the following strings "AUDIO", "VIDEO" or "PHOTO". * defines that length of the (ALPHA/DIGIT) is not fixed.

TABLE 24

GET_MEDIA_LIST = GET_MEDIA_LIST:MEDIA_TYPE;
MEDIA_TYPE = (ALPHA)*

A GET_MEDIA_LIST_RESPONSE command is defined in the WTP 601 as follows in Table 25 for sending the list of the media files available to the JS Engine. An example of such command is as follows: "WiFiOS:GET_MEDIA_LIST_RESPONSE:One.mp3:Two.mp3". MEDIA_LIST contains the list of media files separated by a colon ":". * defines that length of the (ALPHA/DIGIT) is not fixed.

TABLE 25

GET_MEDIA_LIST_RESPONSE =
GET_MEDIA_LIST_RESPONSE:MEDIA_LIST;
MEDIA_LIST = (ALPHA/DIGIT)*

A GET_META_DATA command is defined in the WTP 601 as follows in Table 26 for getting the Meta data of a particular media file. An example of such command is as follows: "WiFiOS: GET_META_DATA:Hello.mp3". FILE_INFO contains information about the filename for which the metadata is requested. * defines that length of the (ALPHA/DIGIT) is not fixed.

TABLE 26

GET_META_DATA = GET_META_DATA:FILE_INFO;
FILE_INFO = (ALPHA/DIGIT)*

A GET_META_DATA_RESPONSE command is defined in the WTP 601 as follows in Table 27 for sending the metadata information of a particular media file to the web-based application engine. An example of such command is as follows: "WiFiOS: GET_META_DATA_RESPONSE:"Rock Boys:Rock:July30". META_DATA_INFO is metadata information of a particular media file. * defines that length of the (ALPHA/DIGIT) is not fixed.

TABLE 27

GET_META_DATA_RESPONSE =
GET_META_DATA_RESPONSE:"META_DATA_INFO";
META_DATA_INFO = (ALPHA/DIGIT)*

Figure 7:
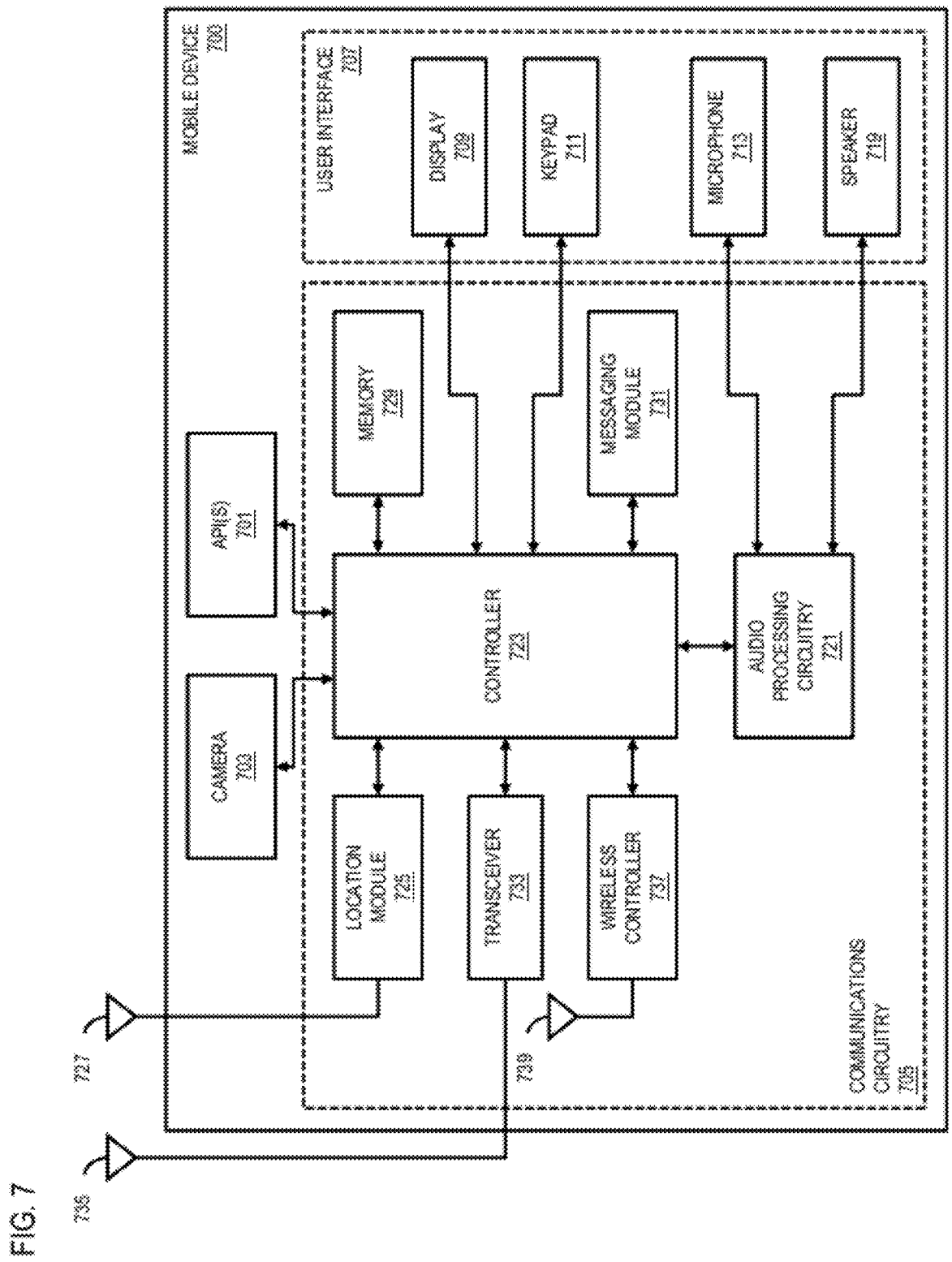
FIG. 7 is a diagram of a mobile device configured to remotely control a STB, according to an exemplary embodiment.

FIG. 7 is a diagram of a mobile device configured to remotely control a STB, according to an exemplary embodiment. Mobile device 700 may comprise computing hardware (such as described with respect to FIG. 8), as well as include one or more components configured to execute the processes described herein for remote control of content processing devices 106 using native functions of mobile device 700. In this example, mobile device 700 includes application programming interface(s) 701, camera 703, communications circuitry 705, and user interface 707. While specific reference will be made hereto, it is contemplated that mobile device 700 may embody many forms and include multiple and/or alternative components.

According to exemplary embodiments, user interface 705 may include one or more displays 709, keypads 711, microphones 713, and/or speakers 715. Display 709 provides a graphical user interface (GUI) that permits a user of mobile device 700 to view dialed digits, call status, menu options, and other service information. The GUI may include icons and menus, as well as other text and symbols. Keypad 709 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Microphone 711 coverts spoken utterances of a user (or other auditory sounds, e.g., environmental sounds) into electronic audio signals, whereas speaker 713 converts audio signals into audible sounds.

Communications circuitry 705 may include audio processing circuitry 721, controller 723, location module 725 (such as a GPS receiver) coupled to antenna 727, memory 729, messaging module 731, transceiver 733 coupled to antenna 735, and wireless controller 737 coupled to antenna 739. Memory 729 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 729 may be implemented as one or more discrete devices, stacked devices, or integrated with controller 723. Memory 729 may store information, such as one or more user profiles, one or more user defined policies, one or more contact lists, personal information, sensitive information, work related information, etc.

Additionally, it is contemplated that mobile device 700 may also include one or more applications and, thereby, may store (via memory 729) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, control signals generated by mobile device 700 may be utilized by API(s) 701 and/or controller 723 to facilitate remotely controlling a content processing device (e.g., STB 103a). It is also contemplated that these (or other) control signals may be utilized by controller 723 to facilitate remotely backing up and/or erasing data associated with these applications. In other instances, the control signals may cause mobile device 700 to become completely or partially deactivated or otherwise inoperable.

Accordingly, controller 723 controls the operation of mobile station 700, such as in response to commands received from API(s) 701 and/or data stored to memory 729. Control functions may be implemented in a single controller or via multiple controllers. Suitable controllers 723 may include, for example, both general purpose and special purpose controllers and digital signal processors. Controller 723 may interface with audio processing circuitry 721, which provides basic analog output signals to speaker 719 and receives analog audio inputs from microphone 713. In exemplary embodiments, controller 723 may be controlled by API(s) 701 in order to capture signals from camera 703 or microphone 713. In other instances, controller 723 may be controlled by API(s) 701 to cause location module 725 to determine spatial positioning information corresponding to a location of mobile device 700. Still further, controller 723 may be controlled by API(s) 701 to image (e.g., backup) and/or erase memory 729, to configure (or reconfigure) functions of mobile device 700, to track and generate device usage logs, or to terminate services available to mobile device 700. It is noted that captured signals, device usage logs, memory images, spatial positioning information, and the like, may be transmitted via transceiver 733 and/or wireless controller 737. In this manner, the captured signals and/or other forms of information may be presented to users and stored to one or more networked storage locations, such as user profiles repository 121, tracking content repository 123, or any other suitable storage location or memory of (or accessible to) the components and facilities of system 100.

It is noted that real time spatial positioning information may be obtained or determined via location module 725 using, for instance, satellite positioning system technology, such as GPS technology. In this way, location module 725 can behave as (or substantially similar to) a GPS receiver. Thus, mobile device 700 employs location module 725 to communicate with constellation of satellites. These satellites transmit very low power interference and jamming resistant signals received by GPS receivers 725 via, for example, antennas 727. At any point on Earth, GPS receiver 725 can receive signals from multiple satellites, such as six to eleven. Specifically, GPS receiver 725 may determine three-dimensional geolocation (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites. Thus, if mobile device 700 is able to identify signals from at least four satellites, receivers 725 may decode the ephemeris and clock data, determine the pseudo range for each satellite and, thereby, compute the spatial positioning of a receiving antenna 727. With GPS technology, mobile device 700 can determine its spatial position with great accuracy and convenience. It is contemplated, however, that location module 725 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like.

Mobile device 700 also includes messaging module 731 that is configured to receive, transmit, and/or process messages (e.g., EMS messages, SMS messages, MMS messages, IM messages, electronic mail messages, and/or any other suitable message) received from (or transmitted to) any other suitable component or facility of system 100. Mobile device 700 may receive API 701 directed messages, e.g., one or more BREW directed SMS messages. As such, messaging module 731 may be configured to identify such messages, as well as activate API(s) 701, in response thereto. Furthermore, messaging module 731 may be further configured to parse control signals from these messages and, thereby, port parsed control signals to corresponding components of mobile device 700, such as API(s) 701, controller 723, location module 725, memory 729, transceiver 733, wireless controller 737, etc., for implementation.

According to exemplary embodiments, API(s) 701 (once activated) is configured to effectuate the implementation of control signals received from network 107, for instance. It is noted that the control signals are utilized by API(s) 701 to, for instance, remotely control, configure, monitor, track, and/or capture signals from (or related to) camera 103, communications circuitry 705, and/or user interface 707. In this manner, visual and/or acoustic indicia pertaining to an environment surrounding mobile device 700 may captured by API(s) 701 controlling camera 703 and microphone 713. Other control signals to cause mobile device 700 to determine spatial positioning information, to image and/or erase memory 729, to configure (or reconfigure) functions, to track and generate device usage logs, or to terminate services, may also be carried out via API(s) 701. As such, one or more signals captured from camera 703 or microphone 713, or device usage logs, memory images, spatial positioning information, etc., may be transmitted via transceiver 733 and/or wireless controller 737, in response to corresponding control signals provided to transceiver 733 and/or wireless controller 737 by API(s) 701. Thus, captured signals and/or one or more other forms of information provided to platform 103 may be presented to users and/or stored to one or more of user profiles repository 121 and tracking content repository 123, or any other suitable storage location or memory of (or accessible to) the components and facilities of system 100.

It is also noted that mobile device 700 can be equipped with wireless controller 737 to communicate with a wireless headset (not shown) or other wireless network. The headset can employ any number of standard radio technologies to communicate with wireless controller 737; for example, the headset can be BLUETOOTH enabled. It is contemplated that other equivalent short range radio technology and protocols can be utilized. While mobile device 700 has been described in accordance with the depicted embodiment of FIG. 7, it is contemplated that mobile device 700 may embody many forms and include multiple and/or alternative components.

The described processes and arrangement advantageously enables control of set top boxes in response to a native function of a user device invoked by a web-based application. The processes described herein for providing set top box control may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
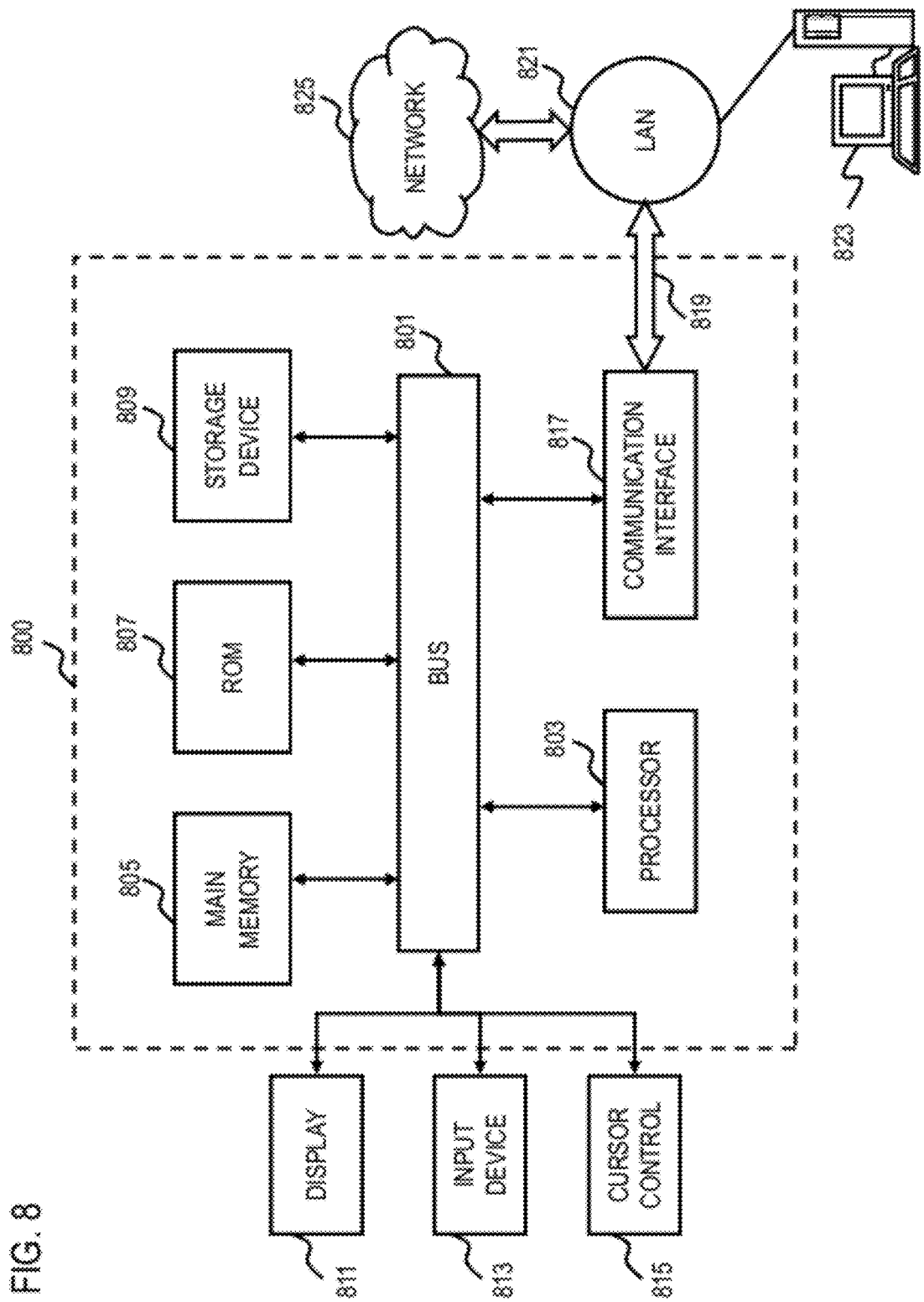
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. For Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. A wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 9 illustrates a chip set 900 upon which an embodiment of the invention may be implemented. Chip set 900 is programmed to present a slideshow as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 3 and 5.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a mobile terminal native function associated with a set top box via a web-based application. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   executing a web-based media application and a shell application, wherein the web-based media application is executed by a set-top box and the shell application is executed by a mobile terminal, and the shell application provides communication between the web-based media application and a native function of the mobile terminal;
registering the web-based media application with the shell application for the communication; and
invoking the native function of the mobile terminal via the communication based upon a communication protocol that specifies a command of a native function associated with a set-top box;
wherein the method further comprises one or more of:
unregistering the web-based media application with the shell application; and
deleting by the shell application the web-based media application,
wherein the shell application is configured to access, through a common application programming interface (API), all native functions of the mobile terminal, and to run on top of a common web runtime application,
wherein the shell application is compatible with multiple computing platforms, and
wherein the command specifies pushing one or more media content items downloaded to the mobile terminal from a website to the set-top box.

2. A method of claim 1, further comprising:
initiating by the web-based media application a call to the shell application for the communication; and
processing by the web-based media application a callback from the shell application for the communication.

3. A method of claim 2, further comprising:
initiating by the shell application invocation of the native function from a native library storing all native functions of the mobile terminal.

4. A method of claim 3, further comprising:
encoding text-based data into binary data, wherein the text-based data includes command, data, content item, or a combination thereof; and
transmitting the binary data between the web-based media application and the native function of the mobile terminal to invoke the native function.

5. A method of claim 2, wherein the call includes one or more remote user selections associated with the native function of the mobile terminal.

6. A method of claim 3, wherein all the native functions stored in the native library are further associated with a calendar application, a contacts application, a camera, a global positioning system, and an accelerometer.

7. A method of claim 1, wherein the command further specifies either retrieval of a list of available set-top boxes, sending a list of available set-top boxes, establishing a connection to one or more set-top boxes, sending one or more remote control commands to one or more set-top boxes, retrieving favorite channel information, retrieving a list of media content items available at one or more set-top boxes, or a combination thereof.

8. A method of claim 1, wherein the communication protocol is text based, and the web-based media application complies with a hypertext markup language, a cascading style sheet, a scripting language, or a combination thereof.

9. An apparatus comprising:
at least one processor; and
at least one memory including computer program code, the at least one memory and the computer program code configured to, with the at least one processor, cause the apparatus to perform at least the following,
execute a web-based media application and a shell application, wherein the web-based media application is executed by a set-top box and the shell application is executed by a mobile terminal, and the shell application provides communication between the web-based media application and a native function of a mobile terminal;
register the web-based media application with the shell application for the communication; and
invoke the native function of the mobile terminal via the communication based upon a communication protocol that specifies a command of a native function associated with a set-top box;
wherein the apparatus is further caused to perform one or more of:
unregister the web-based media application with the shell application; and
delete by the shell application the web-based media application,
wherein the shell application is configured to access, through a common application programming interface (API), all native functions of the mobile terminal, and to run on top of a common web runtime application,
wherein the shell application is compatible with multiple computing platforms, and
wherein the command specifies pushing one or more media content items downloaded to the mobile terminal from a website to the set-top box.

10. An apparatus according to claim 9, wherein the apparatus is further caused to:
initiate via the web-based media application a call to the shell application for the communication; and
process via the web-based media application a callback from the shell application for the communication.

11. An apparatus according to claim 10, wherein the apparatus is further caused to:
initiate via the shell application invocation of the native function from a native library storing all native functions of the mobile terminal.

12. An apparatus according to claim 11, wherein the apparatus is further caused to:
encode text-based data into binary data, wherein the text-based data includes command, data, content item, or a combination thereof; and
transmit the binary data between the web-based media application and the native function of the mobile terminal to invoke the native function.

13. An apparatus according to claim 11, wherein all the native functions stored in the native library are further associated with a calendar application, a contacts application, a camera, a global positioning system, and an accelerometer.

14. An apparatus according to claim 9, wherein the command specifies either retrieval of a list of available set-top boxes, sending a list of available set-top boxes, establishing a connection to one or more set-top boxes, sending one or more remote control commands to one or more set-top boxes, retrieving favorite channel information, retrieving a list of media content items available at one or more set-top boxes, or a combination thereof.

15. An apparatus according to claim 9, wherein the communication protocol is text based, and the web-based media application complies with a hypertext markup language, a cascading style sheet, a scripting language, or a combination thereof.

16. A non-transitory computer-readable storage medium carrying one or more sequences of one or more instructions which, when executed by one or more processors, cause an apparatus to at least perform the following steps:

executing a web-based media application and a shell application, wherein the web-based media application is executed by a set-top box and the shell application is executed by a mobile terminal, and the shell application provides communication between the web-based media application and a native function of the mobile terminal;

registering the web-based media application with the shell application for the communication; and invoking the native function of the mobile terminal via the communication based upon a communication protocol that specifies a command of a native function associated with a set-top box;

wherein the apparatus is caused to further perform one or more of:

unregistering the web-based media application with the shell application; and deleting by the shell application the web-based media application, wherein the shell application is configured to access, through a common application programming interface (API), all native functions of the mobile terminal, and to run on top of a common web runtime application, wherein the shell application is compatible with multiple computing platforms, and wherein the command specifies pushing one or more media content items downloaded to the mobile terminal from a website to the set-top box.

17. A non-transitory computer-readable storage medium of claim 16, wherein the apparatus is caused to further perform:

initiating via the web-based media application a call to the shell application for the communication; and processing via the web-based media application a callback from the shell application for the communication.

18. A non-transitory computer-readable storage medium of claim 17, wherein the apparatus is caused to further perform:

initiating via the shell application for the communication the native function from a native library storing all native functions of the mobile terminal;

encoding text-based data into binary data, wherein the text-based data includes command, data, content item, or a combination thereof; and transmitting the binary data between the web-based media application and the native function of the mobile terminal to invoke the native function, wherein all the native functions stored in the native library are further associated with a calendar application, a contacts application, a camera, a global positioning system, and an accelerometer.

* * * * *